US012702145B2

(12) United States Patent
Hirata et al.

(10) Patent No.: US 12,702,145 B2
(45) Date of Patent: Aug. 11, 2026

(54) COMPOSITION AND USE OF THE COMPOSITION AS AN EDIBLE COATING OR INSERTION FOR COLD OR FROZEN PRODUCTS

(71) Applicant: Cargill, Incorporated, Wayzata, MN (US)

(72) Inventors: Karen Tatsume Hirata, Jacarei (BR); Patricia Paixão Martins, Vila Moinho Velho (BR)

(73) Assignee: Cargill, Incorporated, Wayzata, MN (US)

( * ) Notice: Subject to any disclaimer, the term of this patent is extended or adjusted under 35 U.S.C. 154(b) by 328 days.

(21) Appl. No.: 18/252,898

(22) PCT Filed: Nov. 12, 2021

(86) PCT No.: PCT/US2021/072372
§ 371 (c)(1),
(2) Date: May 15, 2023

(87) PCT Pub. No.: WO2022/104368
PCT Pub. Date: May 19, 2022

(65) Prior Publication Data

US 2023/0413852 A1 Dec. 28, 2023

(30) Foreign Application Priority Data

Nov. 16, 2020 (EP) .................................... 20207743

(51) Int. Cl.

*A23G 9/32* (2006.01)
*A23G 9/34* (2006.01)
*A23G 9/40* (2006.01)
*A23G 9/42* (2006.01)
*A23G 9/48* (2006.01)

(52) U.S. Cl.
CPC ............ *A23G 9/322* (2013.01); *A23G 9/327* (2013.01); *A23G 9/34* (2013.01); *A23G 9/40* (2013.01); *A23G 9/42* (2013.01); *A23G 9/48* (2013.01)

(58) Field of Classification Search
None
See application file for complete search history.

(56) References Cited

U.S. PATENT DOCUMENTS

| | | | |
|---|---|---|---|
| 6,488,971 | B1 | 12/2002 | Van |
| 2003/0175388 | A1 | 9/2003 | Napolitano et al. |

FOREIGN PATENT DOCUMENTS

| | | | |
|---|---|---|---|
| CA | 2595410 | A1 | 2/2008 |
| CN | 1642436 | A | 7/2005 |
| CN | 105813467 | A | 7/2016 |
| CN | 109219353 | A | 1/2019 |
| JP | 2010268749 | | * 12/2010 |
| JP | 2012-244920 | A | 12/2012 |
| WO | 2010072481 | A1 | 7/2010 |
| WO | 2014142648 | A1 | 9/2014 |
| WO | 2015086349 | A1 | 6/2015 |
| WO | 2017055520 | A1 | 4/2017 |
| WO | 2017207686 | A1 | 12/2017 |

OTHER PUBLICATIONS

Beckett et al (ed) Beckettâs Industrial Chocolate Manufacture and Use, 5th Edition, Chapter 19 Chocolate compounds and coatings Chapter 19 Summary, p. 1 (Year: 2017).*
DPO. Emulsifier in Chocolate—How is the Different Function of Lecithin and PGPR in Chocolate? pp. 1-3 (Year: 2016).*
Kumar et al Whey Proteins: A potential ingredient for food industry—A review, Asian J. Dairy & Food Research, pp. 283-290 (Year: 2018).*
SPXFlow Demineralized Whey Powder, pp. 1-8 https://www.foxscientific.com/assets/img/Industry/Vendor%20Pdfs/Food%20Dairy%20&%20Cosmetic/Lightning%20Food%20Demineralized%20Whey%20Powder.pdf (Year: 2017).*

* cited by examiner

*Primary Examiner* — Kelly J Bekker

(57) ABSTRACT

It is herein described a cocoa based coating composition comprising a fat portion, said composition being liquid at room temperature, but rapidly solidifying when in contact with said cold or frozen food products, forming a cocoa coating or cocoa insertions, such as cocoa granules. It is also described the use of said composition as coating or insertion for cold or frozen food products.

18 Claims, No Drawings

COMPOSITION AND USE OF THE COMPOSITION AS AN EDIBLE COATING OR INSERTION FOR COLD OR FROZEN PRODUCTS

CROSS-REFERENCE TO RELATED APPLICATIONS

This application is a national phase of International Application No. PCT/US2021/072372, filed Nov. 12, 2021, which claims the benefit of European Application No. 20207743.4, filed Nov. 16, 2020, each of which is incorporated by reference herein in its entirety.

FIELD OF THE INVENTION

The present invention is related to the food field, more specifically to a coating or insertion on or for a food, even more specifically to a coating or insertion on or for cold or frozen food products.

It is herein described a cocoa and milk based composition comprising a fat portion, said composition being liquid at room temperature, but rapidly solidifying when in contact with said cold or frozen food products, forming a cocoa coating or cocoa insertions, such as cocoa granules or flakes. It is also described the use of said composition as coating or insertion for cold or frozen food products.

BACKGROUND OF INVENTION

Coatings for ice cream are long known, particularly chocolate or cocoa coating compositions, but other flavored, sugar and fat based coatings are also known. A chocolate coating composition meets regulatory requirements for labelling as chocolate, whereas a cocoa coating composition is a chocolate-like coating containing cocoa derived ingredients but that might not meet all national labelling requirements for chocolate.

The present invention is particularly related to compositions which are liquid at room temperature and solidify when cooled.

Some examples of prior art documents related to such coatings are briefly discussed below.

U.S. Pat. No. 6,488,971 discloses a "resilient pure chocolate coating composition for coating novelty ice cream items" having a melting point above 0° C. and below 20° C. It is also described that said composition is eutectic, being stable over a wide temperature range, but that above 38° C. there will be no crystal nuclei in the liquid. The composition is prepared comprising:

15%-50% of chocolate liquor and cocoa butter;

15%-40% of sugar; and

15%-50% of butter fat.

CA2595410 describes chocolate chips for use with ice cream novelty products having a melting curve ranging from 0° C. to 37° C. The proposed composition comprises:

15-40% of chocolate liquor, 15-60% of sugar; and 20-50% of fat content, in which at least 50% of the fat content has a melting point below 20° C.

WO2010072481 is focused on coating compositions for frozen confections having reduced amounts of saturated fat. Therefore, it is provided a coating composition comprising 63-70% (wt) of a fat component comprising:

70-95% (wt) of a palm oil fraction or blend of fractions which contains at most 8% wt of S3 triglycerides and which has a S2U:SU2 ratio of >2.5;

5-15% of a liquid oil; and 0-15% of cocoa butter.

The liquid coating is held in a dipping tank at 30-50° C.

WO2014142648 describes a fat composition suitable for frozen products.

Several embodiments are described. It teaches fat compositions preferably comprising cocoa powder, sweeteners (including sugar), milk fractions, cocoa butter, several oils (coconut oil, palm, palm kernel oil, canola, sunflower, safflower and/or fractions and/or esterification thereof), emulsifiers (lecithin from soy, sunflower, or rapeseed, AMP, mono- and diglycerides and their lactic acid esters and citric acid ester (citrem), polyglycerol esters (e.g., polyglycerol polyricinoleate (PGPR)), sorbitan tristearate (STS)), aromas or flavors (natural vanilla or vanillin) and other ingredients such as nuts, raisins, and/or fruits.

In Example 2 (specific for ice cream coating) it is described that the mixing of chocolate is heated to a temperature of 40° C. and that the dipping of the ice cream is performed at room temperature.

As can be seen from the prior art documents above, in general, such coating compositions should be maintained under heat in order to be maintained liquid for application. However, it is desirable to provide coating compositions which can be kept liquid at room temperature, i.e., coating compositions that do not need heating before application to a cold or frozen food item. Such compositions eliminate the need for a heat exchanger or melting tank.

Moreover, although some of the prior art documents mention that the disclosed compositions are liquid or partially liquid at room temperature, it is essential that said liquid compositions rapidly solidify when in contact with a frozen product for two main reasons: 1) industrially, it lowers the losses that may occur due to dripping of the coating during the process of production; and 2) if the coating is made by a user/attendant (for example, in fast-food services), it lowers the time lapse waiting for the solidification of the coating, allowing the attendant to serve more costumers in a given period of time.

OBJECTIVES OF THE INVENTION

The objective of the present invention is to provide compositions that are liquid at room temperature but rapidly solidify when in contact with a cold or frozen product, wherein said composition is preferably for use as an edible coating or insertion.

BRIEF DESCRIPTION OF THE INVENTION

The objective of the present invention is achieved as set out in the claims. For example, the objective of the present invention is achieved with a composition comprising: from 33 to 59 wt. % of body agents; and from 34 to 54 wt. % of a fat portion including: rheology agents, stabilizing agents and emulsifiers.

It is also achieved by the use of said composition as an edible coating on or insertion(s) in cold or frozen products.

DETAILED DESCRIPTION OF THE INVENTION

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise.

Some of the terms used to describe the present invention are set out below:

“Food product” refers to a material that is, or is included in, an edible product. The term food product includes un-finished, finished, un-cooked and/or cooked products.

“Sweetener” or “edulcorant” refers to any type of sweetener or sweetener-containing formulation which is suitable for use in food. Examples of sweeteners include: monosaccharides, such as glucose, dextrose, fructose, allulose or galactose; disaccharides such as sucrose (also called saccharose), lactose or maltose; polyols such as sorbitol, mannitol, maltitol, xylitol, erythritol or isomalt; high intensity sweeteners, such as Stevia® (with steviol glycosides as active compounds); honey, agave syrup, and combinations of two or more thereof.

The terms “body agents”, “bulking agents”, “fillers” and “filling agents” are used interchangeably in the present specification. The terms “body agents”, “bulking agents”, “fillers” and “filling agents” include, but are not limited to, non-fat solids including maltodextrin, edulcorants, sweeteners, partially demineralized whey, milk permeate, lactose, whole milk, whey, milk permeate, lactose, skimmed milk, dairy compounds, cocoa powder, sugar, fibres, milk powder and flavors, or any mixtures of two or more thereof.

“Partially demineralized whey” refers to whey which has had a portion of minerals removed, compared to raw whey. Typical levels of demineralization are 25 weight %, 50 weight % and 90 weight % (i.e., the specified percentage of minerals present in the raw whey are removed). Demineralized whey is produced by treating raw whey by physical separation techniques such as precipitation, filtration and/or dialysis.

The term “fat portion” refers to a component which includes one or more fats. A “fat portion” can include “rheology agents”, “stabilizing agents” and/or “emulsifiers”.

“Rheology agents” refers to components which affect the rheology of a composition. The rheology of a composition relates to its consistency, degree of fluidity and other mechanical properties. “Rheology agents” can include anhydrous milk fat, palm oleine, cottonseed oil, soy oil, cocoa butter, high oleic sunflower oil, or any mixtures of two or more thereof.

“Stabilizing agents” refers to components which stabilise a composition, so that the structure of the composition is maintained over time. “Stabilizing agents” can include sorbitan triestearate (STS) and/or sorbitan monostearate.

“Emulsifiers” refers to components which help two liquids mix. As a non limiting example, water and oil tend to separate; adding an emulsifier helps the two liquids mix. “Emulsifiers” can include soy lecithin, sunflower lecithin, polyglycerol polyricinoleate (PGPR), super PGPR, ammonium phosphatide, monoglycerides, diglycerides, or any mixtures of two or more thereof.

“Weight %” or “wt. %” refers to the percentage weight in grams of a component of a composition in every 100 grams of a composition. For example, if a composition contains 10 weight % of component A, then there is 10 g of component A for every 100 g of the composition.

“Cocoa mass”, sometimes referred to as “cocoa pasta” or “cocoa liquor”, refers to a cocoa containing product obtained by grinding cocoa nibs. Cocoa mass can be further processed into cocoa butter and cocoa powder. After pressing cocoa mass, cocoa butter can be separated out, leaving a cocoa cake that can then be further ground into cocoa powder. a mixture of cocoa butter and cocoa powder.

The terms “coating”, “topping”, “covering” and similar may be freely exchanged for the purpose of the present invention as they all intend to refer to a composition which is used to cover part or the whole of the surface of a frozen product, thus forming a coating.

The term “insertion” is related to the addition of the composition while liquid to the cold or frozen product in order to produce granules, flakes, chips, sheets (like in Stracciatella-style ice creams) and similar in said product.

Moreover, by “cold or frozen product” the present invention means any edible product that is consumed cold or frozen, including, but not restricted to, ice creams, milk-free ice-cream alternatives, frozen yoghurts, water ices, sorbets, and the like.

For “room temperature” it is meant a temperature in the range of from 15 to 30° C., preferably from 20 to 28° C., more preferably from 21 to 26° C.

For “about” it is meant any standard deviation accepted as it will be promptly conceived by a person skilled in the art. In a preferred embodiment, “about” means a standard deviation of 5%.

According to a first aspect of the present invention, there is provided a composition for coating a cold or frozen food product, characterized in that the composition comprises:

from 33 to 59 wt. % of body agents; and from 34 to 54 wt. % of a fat portion, the fat portion comprising: rheology agents, stabilizing agents and emulsifiers.

Preferably, characterized in that the composition further comprises from 3 to 14 wt. % of flavoring agents.

Further preferably, characterized in that the body agents are selected from, sweeteners and/or filling agents.

Advantageously, characterized in that the body agents are selected from maltodextrin, a sweetener, an edulcorant, partially demineralized whey, milk permeate, lactose, whole milk, whey, milk permeate, lactose, skimmed milk, a dairy compound, cocoa powder, a mixture of cocoa powder and cocoa butter, or any mixtures of two or more thereof.

Preferably, characterized in that the fat portion comprises:

a. rheology agents that are selected from anhydrous milk fat, palm oleine, cottonseed oil, soy oil, high oleic sunflower oil, cocoa butter and mixtures of two or more thereof;

b. stabilizing agents that are selected from sorbitan triestearate (STS) and/or sorbitan monostearate; and c. emulsifiers that are selected from soy lecithin, sunflower lecithin, polyglycerol polyricinoleate (PGPR), super PGPR, ammonium phosphatide, mono and di glycerides, and mixtures of two or more thereof;

or any mixtures of two or more thereof.

Further preferably, characterized in that the flavoring agent is any flavoring agent in accordance to the desired flavor of the final product, for example, natural or artificial vanillin flavor, alkalinized or non-alkalinized cocoa powder, cocoa mass (sometimes referred to as cocoa pasta) or any mixtures of two or more thereof.

Advantageously, characterized in that the fat portion comprises palm oleine and cottonseed oil, wherein the palm oleine is present at from 24 to 30 wt. % and the cottonseed oil is present at from 14 to 22 wt. %.

Preferably, characterized in that the fat portion comprises one or more emulsifiers at from 0.4 wt. % to 2.0 wt. %.

Further preferably, characterized in that the fat portion comprises the emulsifiers soy lecithin at from 0.3 to 0.7 wt. % and polyglycerol polyricinoleate (PGPR) at from 0.1 to 0.4 wt. %.

Advantageously, characterized in that the body agents comprise partially demineralized whey; optionally, wherein the partially demineralized whey has had a portion of minerals removed, compared to raw whey; optionally, wherein the whey is 25 weight %, or 50 weight % or 90 weight % demineralized.

Preferably, characterized in that the partially demineralized whey is present at from 2 to 12 wt. %.

Further preferably, characterized in that the composition comprises:

- from 27.26 to 55.29 wt. % of sucrose;
- from 2 to 8 wt. % of partially demineralized whey;
- from 1 to 4 wt. % of whole milk;
- from 1 to 4 wt. % of alkalinized cocoa powder;
- from 2 to 8 wt. % of cocoa mass (sometimes referred to as cocoa pasta);
- from 14 to 19 wt. % of cottonseed oil (optionally, Levia 100);
- from 24 to 28 wt. % of palm oleine;
- from 0.3 to 0.6 wt. % of sorbitan triestearate (STS);
- from 0.3 to 0.7 wt. % of soy lecithin;
- from 0.1 to 0.4 wt. % of polyglycerol polyricinoleate (PGPR); and
- from 0.01 to 0.04 wt. % of vanillin.

Advantageously, characterized in that the composition comprises:

- from 30 to 42 wt. % of sucrose;
- from 2 to 12 wt. % of partially demineralized whey;
- from 1 to 5 wt. % of whole milk;
- from 1 to 4 wt. % of alkalinized cocoa powder;
- from 2 to 10 wt. % of cocoa mass (sometimes referred to as cocoa pasta);
- from 14 to 22 wt. % of cottonseed oil (optionally Levia 100);
- from 24 to 30 wt. % of palm oleine;
- from 0.3 to 0.6 wt. % of sorbitan triestearate (STS);
- from 0.3 to 0.7 wt. % of soy lecithin;
- from 0.1 to 0.4 wt. % of polyglycerol polyricinoleate (PGPR); and
- from 0.01 to 0.04 wt. % of vanillin.

Preferably, characterized in that the composition comprises:

- about 35 wt. % of sucrose;
- about 6 wt. % of partially demineralized whey;
- about 2 wt. % of whole milk;
- about 3 wt. % of alkalinized cocoa powder;
- about 6 wt. % of cocoa mass (sometimes referred to as cocoa pasta);
- about 17 wt. % of cottonseed oil (Levia 100);
- about 26 wt. % of palm oleine;
- about 0.5 wt. % of sorbitan triestearate (STS);
- about 0.6 wt. % of soy lecithin;
- about 0.3 wt. % of polyglycerol polyricinoleate (PGPR); and
- about 0.02 wt. % of vanillin.

Further preferably, characterized in that the composition is for use as an edible coating on or insertion in cold or frozen products.

Advantageously, characterized in that the composition is liquid at room temperature.

Preferably, characterized in that the composition solidifies in a time lower than 12 seconds, preferably from about 7 to about 12 seconds, even more preferably from about 8 to about 10 seconds when in contact with a cold or frozen product.

In another aspect of the present invention, there is provided the use of the composition for coating a cold or frozen food product as defined herein, characterized in that the composition is as an edible coating on or insertion in cold or frozen products.

The present invention also relates to an edible composition comprising:

- 33 to 59 wt. % of body agents; and
- 34 to 54 wt. % of a fat portion including: rheology agents, stabilizing agents and emulsifiers.

In one aspect of the invention, the edible composition further comprises 3 to 14 wt. % of flavoring agents.

Said composition is liquid at room temperature, but is rapidly solidified when in contact to low temperatures, for example, in contact with a cold or frozen food, thus forming a coating on or insertion(s) in said product.

Preferably, the terms "rapidly solidified", "rapid solidification" and the like mean a solidification in a time lower than 12 seconds, preferably from about 7 to about 12 seconds, even more preferably from about 8 to about 10 seconds.

Advantageously, the body agents are selected from, sweeteners and/or filing agent.

Preferably, the body agents are selected from, but are not limited to sucrose, maltodextrin, any edulcorant, one or more sweeteners, partially demineralized whey, milk permeate, lactose, whole milk, a mixture of whey, milk permeate, lactose, skimmed milk and dairy compound, cocoa powder, or any mixtures of two or more thereof.

Advantageously, the fat portion comprises:

- d. rheology agents that are selected from, but are not limited to anhydrous milk fat, palm oleine, cottonseed oil, soy oil, high oleic sunflower oil, or any mixtures of two or more thereof;
- e. stabilizing agents that are selected from, but are not limited to sorbitan triestearate (STS) and/or sorbitan monostearate; and
- f. emulsifiers that are selected from, but are not limited to soy lecithin, sunflower lecithin, polyglycerol polyricinoleate (PGPR), super PGPR, ammonium phosphatide, mono and di glycerides, or any mixtures of two or more thereof, or any mixtures or two or more thereof.

Preferably, cottonseed oil is present. More preferably, the cottonseed oil is a refined, blanched and deodorized cottonseed oil added from a blend with one or more antioxidants (example antioxidants include butylated hydroxytoluene (BHT), tert-butylhydroquinone (TBHQ) and/or vitamin E).

The flavoring agent may be any flavoring agent in accordance with the desired flavor of the final product, for example, natural or artificial vanillin flavor, alkalinized or non-alkalinized cocoa powder, cocoa pasta or any mixtures of two or more thereof.

As will be promptly conceived by a person skilled in the art, the flavoring agents may also act as coloring agents.

Preferably, the composition of the present invention comprises:

- 30 to 42 wt. % of sucrose;
- 2 to 12 wt. % of partially demineralized whey;
- 1 to 5 wt. % of whole milk;
- 1 to 4 wt. % of alkalinized cocoa powder;
- 2 to 10 wt. % of cocoa pasta;
- 14 to 22 wt. % of cottonseed oil (Levia 100);
- 24 to 30 wt. % of palm oleine;
- 0.3 to 0.6 wt. % of sorbitan triestearate (STS);

0.3 to 0.7 wt. % of soy lecithin;
0.1 to 0.4 wt. % of polyglycerol polyricinoleate (PGPR); and
0.01 to 0.04 wt. % of vanillin.

More preferably, the composition will comprise:
about 35 wt. % of sucrose;
about 6 wt. % of partially demineralized whey;
about 2 wt. % of whole milk;
about 3 wt. % of alkalinized cocoa powder;
about 6 wt. % of cocoa pasta;
about 17 wt. % of cottonseed oil (Levia 100);
about 26 wt. % of palm oleine;
about 0.5 wt. % of sorbitan triestearate (STS);
about 0.6 wt. % of soy lecithin;
about 0.3 wt. % of polyglycerol polyricinoleate (PGPR); and
about 0.02 wt. % of vanillin.

As mentioned above, said composition may be an edible composition for use as an edible coating on frozen products.

Moreover, by “frozen products” it is meant, for example, frozen desserts in general, especially ice creams.

Finally, it is also described the use said composition as an edible coating on frozen products.

EXAMPLES

Example 1

A composition was prepared as described in Table 1 below:

TABLE 1

Cocoa composition for use on frozen products

| Component | Kg | % |
|---|---|---|
| Sucrose | 10.68 | 35.583 |
| Partially demineralized whey | 2.01 | 6.714 |
| Whole milk | 0.86 | 2.877 |
| Alkalinized cocoa powder | 1.01 | 3.357 |
| Cocoa mass (sometimes referred to as cocoa pasta) | 2.01 | 6.714 |
| Levia 100 (cottonseed oil) | 5.18 | 17.264 |
| Palm oleine | 7.84 | 26.146 |
| Sorbitan triestearate (STS) | 0.144 | 0.480 |
| Soy lecithin | 0.173 | 0.575 |
| Polyglycerol polyricinoleate (PGPR) | 0.081 | 0.269 |
| Vanillin | 0.006 | 0.021 |
| TOTAL | 30.0 | 100.0 |
| Yield | 29.7 | 0.99 |

The composition of Table 1 was maintained at 23° C. and ice cream at −5° C. was dipped in the composition. The crystallization time was measured as being the time in which the composition stops dripping at a temperature of 23° C. and 1 atmosphere pressure. The crystallization time results are described in Table 2 below.

TABLE 2

Crystallization time of the composition

| Time (s) | Observation |
|---|---|
| 7 | spinning 2.5 turns of ice cream |
| 8 | spinning 2.5 turns of ice cream |
| 10 | spinning 2.5 turns of ice cream |
| 10 | spinning 2.5 turns of ice cream |
| 11 | spinning 2.5 turns of ice cream |

As can be seen from the results above, the median time for crystallization of the composition is about 9 seconds.

Example 2

The crystallization time was compared between a composition according to Table 1 and a standard composition.

The composition, according to Table 1, was maintained at 23° C., and the standard composition was a composition that had to be maintained hot, at approximately 45° C., to maintain it in liquid form.

During the test, the number of spins of the ice cream was standardized for all samples in order to standardize the thickness of the coating.

The standard composition being as described in Table 3 below:

TABLE 3

Standard composition for use on frozen products

| Component | % |
|---|---|
| PALM OLEINE | 42.355 |
| COTTON OIL | 7.473 |
| CRYSTAL SUGAR | 41.847 |
| MILK SERUM | 0.907 |
| COCOA POWDER | 6.802 |
| SOY LECITHIN | 0.499 |
| POLYGLYCEROL POLYRICINOLEATE (PGPR) | 0.100 |
| CHOCOLATE AROMA | 0.017 |
| TOTAL | 100.0 |

The ice cream was dipped in both compositions (the compositions of Table 1 and Table 3) and the crystallization time results are disposed in Table 4 below. Ice cream at −5° C. was dipped in each composition. The crystallization time was measured as being the time in which each composition stops dripping at a temperature of 23° C. and 1 atmosphere pressure.

TABLE 4

Crystallization time of the composition

| Sample | Composition of Table 1 | Standard composition of Table 3 |
|---|---|---|
| 1 | 11.75 | 10.13 |
| 2 | 12.47 | 12.66 |
| 3 | 11.94 | 10.56 |
| 4 | 11.94 | 13.15 |
| 5 | 11.69 | 12.25 |
| Average | 11.96 | 11.75 |

As can be seen from the results above, the average time for crystallization of the composition of Table 1 is 11.96 seconds and the standard composition is 11.75.

Therefore, it can be concluded that no relevant difference in the crystallization time is verified between the compositions as herein taught in comparison to a standard composition that has to be maintained hot.

Moreover, it was verified that the standard composition (of Table 3) is saturated after several repetitions of dipping the ice cream since the high temperature of the coating results in the melting of the ice cream into the coating. Such problem was not identified in the composition as taught herein due to the lower difference between the temperature of the ice cream and the coating.

Example 3

A composition was prepared, according to Table 1, and the crystallization time was compared between the composition of Table 1 and the Marvi's composition available in the market that is also for cold coating (without need of heating).

For prompt reference, Marvi's composition comprises soybean oil, sugar, coconut fat, cocoa powder, hydrogenated vegetable fat, salt, artificial flavorings and soy lecithin (INS 322 emulsifier).

During the test, the number of spins of the ice cream was standardized for all samples in order to standardize the thickness of the coating.

Both compositions were maintained at 23° C. The ice cream was dipped in both compositions and the crystallization time results are included in Table 5 below. Ice cream at −5° C. was dipped in each composition. The crystallization time was measured as being the time in which each composition stops dripping at a temperature of 23° C. and 1 atmosphere pressure.

TABLE 5

Crystallization time of the composition (according to Table 1) and Marvi's composition

| Sample | Composition of Table 1 | Marvi's composition |
|---|---|---|
| 1 | 11.75 | 10.28 |
| 2 | 12.47 | 11.25 |
| 3 | 11.94 | 10.44 |
| 4 | 11.94 | 10.78 |
| 5 | 11.69 | 10.75 |
| Average | 11.96 | 10.70 |

As can be seen from the results above, the average time for crystallization of the composition (according to Table 1) is 11.96 seconds and the average time for Marvi's composition is 10.70 seconds.

According to the sensorial tests, the composition of the present invention (of Table 1) has a lighter color and a more "premium" milk taste, while Marvi's coating is darker and a strong taste of aroma and powder cocoa, besides an oil after-taste that remains on the mouth.

Therefore, the composition of the present invention has a crystallization time very close to Marvi's composition, however the sensorial tests reveal a product with better taste.

Having described examples of a preferred embodiments of the present invention, it should be understood that the scope of the present invention encompasses other possible variations of the inventive concept described, being limited only by the content of the appended claims, including the possible equivalents thereof.

The present application claims priority from European patent application number 20207743.4 (in the name of Cargill, Incorporated). The entire disclosure of European patent application number 20207743.4 (in the name of Cargill, Incorporated) is hereby incorporated by reference in its entirety, including the following embodiments:

Clause 1: A composition, characterized in that it comprises:

33 to 59 wt. % of body agents; and 34 to 54 wt. % of a fat portion including: rheology agents, stabilizing agents and emulsifiers.

Clause 2: The composition of clause 1, characterized in that it further comprises 3 to 14 wt. % of flavoring agents.

Clause 3: The composition of any of clauses 1 and 2, characterized in that the body agents are selected from, sweeteners and filling agents.

Clause 4: The composition of any of clauses 1 to 3, characterized in that the body agents are selected from maltodextrin and any edulcorant, partially demineralized whey, milk permeate, lactose, whole milk, a mixture of whey, milk permeate, lactose, skimmed milk and dairy compound, a mixture of cocoa powder and cocoa butter, or any mixtures thereof.

Clause 5: The composition of any of clauses 1 to 4, characterized in that the fat portion comprises:

rheology agents that are selected from anhydrous milk fat, palm oleine, cottonseed oil, soy oil and high oleic sunflower oil;

stabilizing agents that are selected from sorbitan triestearate (STS) and sorbitan monostearate; and emulsifiers that are selected from soy lecithin, sunflower lechthin, polyglycerol polyricinoleate (PGPR), super PGPR, ammonium phosphatide, mono and di glycerides, or any mixtures thereof.

Clause 6: The composition of any of clauses 2 to 5, characterized in that the flavoring agent is any flavoring agent in accordance to the desired flavor of the final product, for example, natural or artificial vanillin flavor, alkalinized or non-alkalinized cocoa powder, cocoa pasta or any mixtures thereof.

Clause 7: The composition of any of clauses 1 to 6, characterized in that it comprises:

30 to 42 wt. % of sucrose;

2 to 12 wt. % of partially demineralized whey;

1 to 5 wt. % of whole milk;

1 to 4 wt. % of alkalinized cocoa powder;

2 to 10 wt. % of cocoa pasta;

14 to 22 wt. % of Levia 100;

24 to 30 wt. % of palm oleine;

0.3 to 0.6 wt. % of sorbitan triestearate (STS);

0.3 to 0.7 wt. % of soy lecithin;

0.1 to 0.4 wt. % of polyglicerol polyrikinoleate (PPR); and 0.01 to 0.04 wt. % of vanillin.

Clause 8: The composition of any of clauses 1 to 7, characterized in that it comprises:

about 35 wt. % of sucrose;

about 6 wt. % of partially demineralized whey;

about 2 wt. % of whole milk;

about 3 wt. % of alkalinized cocoa powder;

about 6 wt. % of cocoa pasta;

about 17 wt. % of cottonseed oil (Levia 100);

about 26 wt. % of palm oleine;

about 0.5 wt. % of sorbitan triestearate (STS);

about 0.6 wt. % of soy lecithin;

about 0.3 wt. % of polyglicerol polyrikinoleate (PPR); and about 0.02 wt. % of vanillin.

Clause 9: The composition of any of clauses 1 to 8, characterized in that it is for use as an edible coating or insertion on cold or frozen products.

Clause 10: The composition of any of clauses 1 to 9, characterized in that composition is liquid at room temperature.

Clause 11: The composition of any of clauses 1 to 10, characterized in that it solidifies in a time lower than 12 seconds, preferably from about 7 to about 12 seconds, even more preferably from about 8 to about 10 seconds when in contact to a cold or frozen product.

Use of the composition as defined in any of clauses 1 to 11, characterized in that it is as an edible coating or insertion on cold or frozen products.

The invention claimed is:

1. A composition for coating a cold or frozen food product, comprising:

from 33 to 59 wt. % of body agents, wherein the body agents comprise non-fat solids, wherein the non-fat solids are selected from the group consisting of a sweetener, a dairy compound, cocoa powder and any mixtures of two or more thereof;

from 3 to 14 wt. % of one or more flavoring agents; and from 38 to 54 wt. % of a fat portion, the fat portion comprising:

a. at least two rheology agents comprising palm olein and cottonseed oil, and optionally, anhydrous milk fat, soy oil, high oleic sunflower oil, cocoa butter, and mixtures of two or more thereof;

b. one or more stabilizing agents that are selected from the group consisting of sorbitan tristearate (STS) and/or sorbitan monostearate; and c. one or more emulsifiers that are selected from the group consisting of soy lecithin, sunflower lecithin, polyglycerol polyricinoleate (PGPR), super PGPR, ammonium phosphatide, mono and di glycerides, and mixtures of two or more thereof; and wherein the composition is liquid at room temperature and the composition comprises from 24 to 30 wt. % palm olein and from 14 to 22 wt. % cottonseed oil .

2. The composition of claim 1, wherein the sweetener comprises sucrose, maltodextrin, or mixtures thereof.

3. The composition of claim 1, wherein the flavoring agent is selected from the group consisting of natural vanillin flavor, artificial vanillin flavor, alkalinized cocoa powder, non-alkalinized cocoa powder, cocoa mass, or any mixtures of two or more thereof.

4. The composition of claim 1, wherein the fat the composition comprises from 0.4 wt. % to 2.0 wt. % of the emulsifiers.

5. The composition of claim 4, wherein the composition comprises soy lecithin from 0.3 to 0.7 wt. % and polyglycerol polyricinoleate (PGPR) from 0.1 to 0.4 wt. %.

6. The composition of claim 1, wherein the body agents comprise partially demineralized whey, wherein the partially demineralized whey has had a portion of minerals removed compared to raw whey.

7. The composition of claim 6, wherein the partially demineralized whey is present at from 2 to 12 wt. %.

8. The composition of claim 6, wherein the partially demineralized whey is at least 25 weight % demineralized compared to raw whey.

9. The composition of claim 1, wherein the composition comprises:

from 27.26 to 55.29 wt. % of sucrose;
from 2 to 8 wt. % of partially demineralized whey;
from 1 to 4 wt. % of whole milk;
from 1 to 4 wt. % of alkalinized cocoa powder;
from 2 to 8 wt. % of cocoa mass;
from 14 to 19 wt. % of cottonseed oil;
from 24 to 28 wt. % of palm olein;
from 0.3 to 0.6 wt. % of sorbitan (STS);
from 0.3 to 0.7 wt. % of soy lecithin;
from 0.1 to 0.4 wt. % of polyglycerol polyricinoleate (PGPR); and
from 0.01 to 0.04 wt. % of vanillin.

10. The composition of claim 1, wherein the composition comprises:

from 30 to 42 wt. % of sucrose;
from 2 to 12 wt. % of partially demineralized whey;
from 1 to 5 wt. % of whole milk;
from 1 to 4 wt. % of alkalinized cocoa powder;
from 2 to 10 wt. % of cocoa mass;
from 14 to 22 wt. % of cottonseed oil;
from 24 to 30 wt. % of palm olein;
from 0.3 to 0.6 wt. % of sorbitan tristearate (STS);
from 0.3 to 0.7 wt. % of soy lecithin;
from 0.1 to 0.4 wt. % of polyglycerol polyricinoleate (PGPR); and
from 0.01 to 0.04 wt. % of vanillin.

11. The composition of claim 1, wherein the composition comprises:

about 35 wt. % of sucrose;
about 6 wt. % of partially demineralized whey;
about 2 wt. % of whole milk;
about 3 wt. % of alkalinized cocoa powder;
about 6 wt. % of cocoa mass;
about 17 wt. % of cottonseed oil;
about 26 wt. % of palm olein;
about 0.5 wt. % of sorbitan tristearate (STS);
about 0.6 wt. % of soy lecithin;
about 0.3 wt. % of polyglycerol polyricinoleate (PGPR); and
about 0.02 wt. % of vanillin.

12. The composition of claim 1, wherein the composition is capable of use as an edible coating on or insertion in cold or frozen products.

13. The composition of claim 1, wherein the composition solidifies in a time lower than 12 seconds when in contact with a cold or frozen product.

14. The composition of claim 1, wherein the composition solidifies in a time between about 7 to about 12 seconds when in contact with a cold or frozen product.

15. The composition of claim 1, wherein the dairy compound is selected from the group consisting of milk permeate, lactose, whey, partially demineralized whey, and mixtures thereof.

16. The composition of claim 1, wherein the composition further comprises whole milk and/or skimmed milk.

17. The composition of claim 1, wherein the composition further comprises fiber.

18. A method of forming a cold or frozen product, wherein the method comprises:

producing a cold or frozen product; and coating on or inserting in the product a composition comprising:

from 33 to 59 wt. % of body agents, wherein the body agents comprise non-fat solids, wherein the non-fat solids are selected from the group consisting of a sweetener, a dairy compound, cocoa powder and any mixtures of two or more thereof;

from 3 to 14 wt. % of one or more flavoring agents; and from 38 to 54 wt. % of a fat portion, the fat portion comprising:

a. at least two rheology agents comprising palm olein and cottonseed oil, and optionally, anhydrous milk fat, soy oil, high oleic sunflower oil, cocoa butter, and mixtures of two or more thereof;

b. one or more stabilizing agents selected from the group consisting of sorbitan tristearate (STS) and/or sorbitan monostearate; and c. one or more emulsifiers selected from the group consisting of soy lecithin, sunflower lecithin, polyglycerol polyricinoleate (PGPR), super PGPR, ammonium phosphatide, mono and di glycerides, and mixtures of two or more thereof;

wherein the composition is liquid at room temperature, and the composition comprises from 24 to 30 wt. % palm olein and from 14 to 22 wt. % cottonseed oil.

* * * * *